H. A. CARPENTER.
MOTOR DRIVEN GAS COMPRESSOR.
APPLICATION FILED MAR. 31, 1914.
1,171,926.
Patented Feb. 15, 1916.
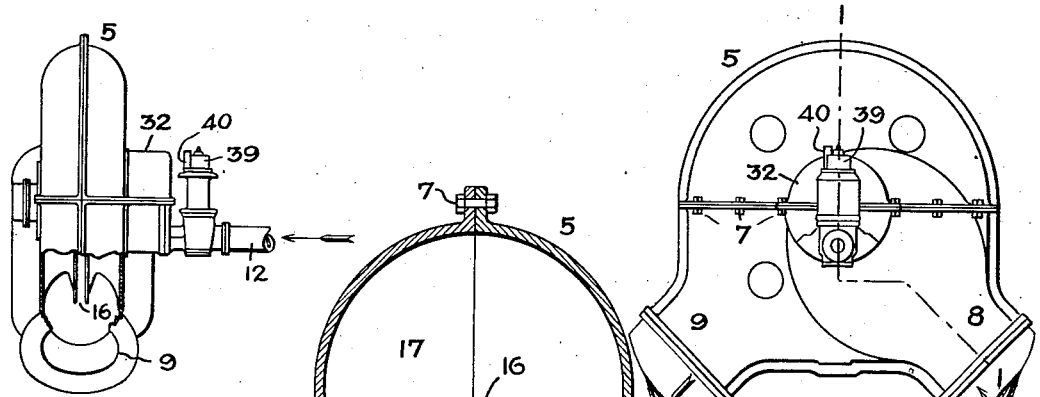
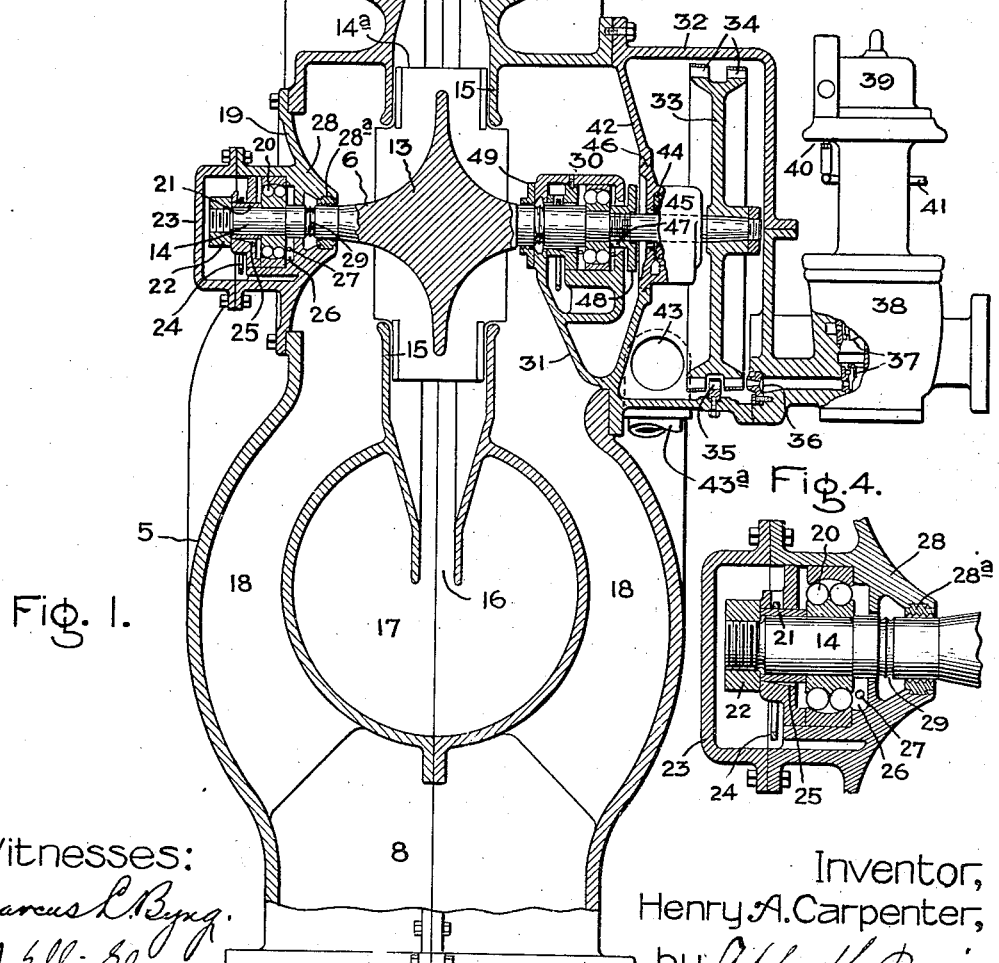
Witnesses:
Marcus L. Byng.
J. Ellis Glen.
Inventor,
Henry A. Carpenter,
by Albert G. Davis
Att'y.

UNITED STATES PATENT OFFICE.

HENRY A. CARPENTER, OF SEWICKLEY, PENNSYLVANIA, ASSIGNOR TO GENERAL ELECTRIC COMPANY, A CORPORATION OF NEW YORK.

MOTOR-DRIVEN GAS-COMPRESSOR.

1,171,926.

Specification of Letters Patent. Patented Feb. 15, 1916.

Application filed March 31, 1914. Serial No. 828,492.

*To all whom it may concern:*

Be it known that I, HENRY A. CARPENTER, a citizen of the United States, residing at Sewickley, county of Allegheny, State of Pennsylvania, have invented certain new and useful Improvements in Motor-Driven Gas-Compressors, of which the following is a specification.

The present invention relates to motor-driven compressors, and in particular to turbine-driven compressors designed for handling gas in the manufacture of illuminating gas and coke. In turbine-driven compressors, as constructed heretofore, the shaft of the compressor extends through its casing and has been provided with stuffing boxes or packings, such as water seals for example. The turbine shaft has also been provided with stuffing boxes or packings to prevent the escape of steam around the shaft where it passes through its casing. Both the compressor and turbine have been complete in themselves although mounted on a common bed-plate or foundation. In some cases the compressor has had supporting feet and the turbine casing bolted to the compressor casing, but in all cases the separate and individual characteristics of the compressor and turbine have been preserved. Theoretically the above mentioned packings will on the one hand prevent the escape of gas to the atmosphere or the admission of air to the compressor casing when the gas pressure is low, and on the other hand the escape of steam from the turbine, but in practice they will not always do this. The packings, when of a mechanical nature and in engagement with the shaft, will wear and ultimately permit leakage. As commonly constructed a water sealed packing comprises a small disk mounted on the shaft and rotating in a chamber of water, the rotation of the disk causing the water to form a seal at its periphery. These will fail if the station attendant neglects to supply a sufficient amount of water and they may fail due to leakages that are invisible to the attendant. Furthermore such a packing is only effective when the shaft is revolving because as soon as it stops the water collects in the bottom of the chamber and gas can leak over the top of the disk. Even though the compressor is not operating there may be a pressure above atmosphere in the casing, in which case gas will escape. Not only is the presence of gas in the atmosphere in the building containing the apparatus highly objectionable from the standpoint of the operatives but at times it may be a source of considerable danger from fire and explosions.

Another and serious problem is encountered when, due to failure of some part of the system, it becomes necessary to pump gas of high temperature through the compressor. This temperature is so great that it would soon melt babbitt out of the shaft bearings, thus necessitating a shut down. In a plant supplying illuminating gas to the inhabitants of a town or city it is, of course, imperative to keep going at any cost. This means first, that the compressor should be rugged in construction and capable of withstanding high temperatures, and second, that if repairs must be made the compressor should be of a character to permit of such repairs being easily and quickly made.

Another, and at times a very serious objection to existing constructions, resides in the fact that the various conduits carrying steam or hot gases or both will expand or contract unequally as the case may be, with the result of imposing undue strains on the casings of the machines or on the conduits or both. Distortions due to this cause not infrequently result in causing the parts to bind, rub, or vibrate excessively.

The object of my invention is to provide a motor-driven compressor which is free from the objections above noted, and which is so constructed and arranged that the rotating structure and its bearings considered as a unit can be quickly removed and a new structure and bearings substituted.

Briefly stated, my invention comprises a motor-driven compressor, the parts of which are so constructed and arranged that a single casing suffices for both, said casing being divided by a partition into impeller and motor chambers. The shaft of the rotating element is wholly inclosed by said casing, as are also the bearings, thereby avoiding the necessity of all external packings or stuffing boxes.

My invention also comprises an elastic support for the compressor whereby destructive distortional stresses due to temperature changes are obviated.

For a consideration of what I believe to be novel and my invention, attention is directed to the accompanying description and claims appended thereto.

In the accompanying drawing which illustrates one of the embodiments of my invention, Figure 1 is a vertical section of a turbo-compressor taken on line 1—1 of Fig. 3; Fig. 2 is a small view in side elevation of the same; Fig. 3 is a front view of the turbo-compressor showing it supported in position by the gas-carrying conduits, and Fig. 4 is a detail view showing the means for lubricating the ball bearings.

The compressor portion 5 of the casing is divided in a vertical plane into right and left-hand sections to facilitate casting and machine operations, and in particular to the surfacing of the annular walls of the gas-conveying passage immediately surrounding the impeller 6. The joint between the casing parts should be carefully machined to prevent leakage, and after the machine is completed will not ordinarily be disturbed. Said casing portion is also divided horizontally in the plane of the shaft into upper and lower parts or sections, the joint being carefully made to prevent leakage. The various sections of said casing portion are flanged and extending through the flanges are clamping bolts 7. The lower half of said casing portion is provided with an inlet passage 8 and a discharge passage 9. The turbo-compressor instead of being supported on a foundation by feet or equivalent devices is mounted directly on the gas inlet conduit 10 and the gas discharge conduit 11, both of which occupy a plane perpendicular to the shaft, are inclined to each other and are capable of yielding laterally by a slight amount when for any reason the steam inlet pipe 12, Fig. 2, or the steam exhaust conduit expands and contracts. Due to the fact that the turbo-compressor is mounted directly on the conduits any expansion and contraction of the latter will result in bodily moving the same by a slight amount as distinguished from distorting the casing. Since the turbine forms a unitary structure with the compressor both will move in unison whether the distortions be due to changes in steam or gas temperatures or both. The conduits 10, 11 and 12 should be long enough to permit these movements to take place without unduly straining their supports or the joints between them and the casing. It will thus be seen that the turbo-compressor is elastically supported and is capable of moving slightly in any direction.

13 indicates the body of the impeller of the compressor which is located in a chamber in said casing and may be made integral with the shaft 14 or be removable therefrom as desired. As the impeller is intended to rotate at high speeds the shaft, no matter how it is made, should be sufficiently rigid to prevent deflection. The impeller body is provided with radial vanes 14$^a$, the outer portions of which extend between the side plates 15. These plates may form the side walls of the spaces or passages between the vanes or they may be formed by rings rotating with the impeller. The vanes and spaces between are so designed and arranged as to impart velocity and some pressure to the gas undergoing compression. The side plates 15 beyond the impeller converge by a sufficient amount to assist in converting the velocity of the gas into pressure, there being an annular throat formed at 16, the sides of which are parallel. The plates project into the annular discharge chamber 17 which communicates with the discharge passage 9. Gas is admitted to both sides of the impeller around the shaft by passages 18 and in this manner axial thrust is avoided. The passages communicate with the inlet 8.

The left-hand side of the compressor portion of the casing is provided with an opening of suitable size, and the metal immediately surrounding the same is carefully finished. Secured to the casing is a shouldered and chambered head 19 which is divided in a horizontal axial plane into two parts. In the chamber in the head is a ball or roller bearing 20, Fig. 4, of suitable construction. The outer member of the bearing is seated on a shoulder formed in the head.

21 indicates a spacing device which engages a shoulder on the shaft and is clamped by the nut 22. This serves to position the rotating element of the machine. Access may be had to the nut by removing the cap 23 which is secured pressure tight on the head. Surrounding the spacer is an oil ring 24 which conveys oil from the chamber below to the spacer from which it flows through the downwardly inclined passage 25 to the bearing. The lubricant is maintained in the bearing at a suitable level by the dam 26, the excess being returned to the oil chamber by the passage 27. Between the chamber in the head and the impeller chamber is a partition 28 and supported thereby is a grooved metal packing 28$^a$ of such character that it will not be injured by relatively high temperatures. This packing does not normally make contact with the shaft so there is no wear at this point. It acts to prevent hot gas from freely entering the bearing chamber where it would soon destroy the lubricant. In a small chamber between the packing and bearing is an oil thrower 29 of ordinary construction.

The right-hand end of the shaft is supported by a ball or roller bearing 30 of the same character as the one on the left. It is supported by a web 31 which forms an integral part of the turbine portion 32 of the casing, said portion incloses the rotor 33 of the steam turbine, and is seated pressure tight on the compressor portion of the casing. The turbine rotor is overhung on the shaft, that is to say, is outside of the bearing 30, thereby permitting the use of two bearings instead of a greater number. As shown, the rotor is of the Curtis type and has two rows of buckets 34 and a segmental row of intermediates 35. The rotor is fitted to the taperd end of the shaft and is held in place by a nut. It is to be noted that the shaft does not extend through the outer walls of the casing at either end and by this arrangement all opportunity for the gas and steam to escape from the casing or for air to enter is prevented. Steam is supplied to the turbine by the nozzle 36 subject to the control of one or more valves 37 contained in the valve chest 38. This valve may be controlled in any suitable manner. As shown, the valves are actuated by a fluid motor 39 subject to the control of a pilot valve 40, the latter being connected to a governor lever 41. Since the shaft is totally inclosed by the walls of the casing which are closed at every point, and since the ordinary speed governor would require some movable element extending through the casing with a fluid tight packing, I prefer to use a governing mechanism that is responsive to changes in the rate of flow of the fluid through one of the conduits of the compressor, such as a float in the inlet conduit 10, but my invention is not limited thereto.

The turbine portion of the casing and also the dished partition wall 42 between it and the compressor portion of the casing are divided in the plane of the shaft into upper and lower parts or sections. This is done to enable the rotating element to be removed as a unit when the top part of the casing is removed. The upper parts of both portions of the casing are rigidly bolted together, and hence for the purpose here referred to they can be treated as a unitary structure. Aside from facilitating the manufacture of the apparatus by making the upper and lower parts of the casing of separate pieces rigidly united, it permits access to be had to one portion of the apparatus without disturbing the other, as is sometimes desirable. Exhaust steam is carried away from the turbine by the outlet 43 and conduit 43ª.

In order to prevent steam from the turbine portion from entering the compressor portion as completely as possible, a packing 44 is provided composed of a plurality of rings. Carbon is satisfactory for this purpose since it will take a high polish as the shaft rotates, will not cut the shaft, and will stand relatively high temperatures. This packing is carried by a housing 45 that has a peripheral tongue 46 fitting pressure tight into a groove in the partition 42, the latter dividing the interior of the casing into two principal chambers. I have shown the partition 42 as being formed integral with one of the portions of the casing, i. e., of the turbine, but my invention is not limited thereto. The housing 45 can be made in one or more pieces, preferably two, depending upon the arrangement of the packing ring. However it is constructed, it is best to make it removable as a unit with the shaft.

Between the packing and the ball bearing is a nut 47 for clamping the bearing in place, and said nut is provided with a disk 48 which acts after the fashion of an impeller to prevent steam from entering the bearing in case of leakage by driving it outwardly. Ordinarily the packing will prevent leakage, but if a slight leak does exist the entrance of a small amount of steam into the gas will do no harm. On the left-hand end of the bearing 30 and mounted on the shaft is a packing 49 similar to the one previously described for preventing the gas from working into the lubricant.

Assuming that it is necessary to make a quick repair the bolts holding the upper and lower sections of the casing are removed and also the bolts which secure the bearing cap 23 in place. The upper casing section can then be removed as a unit. It is unnecessary to disconnect any of the conduits because they are all secured to the lower half of the casing or to disturb the valve mechanism. After the casing section is removed, the bolts holding the cap of the bearing 30 are removed, then the rotating structure, together with its bearings and packings, can be lifted out as a unit and another structure installed. The cap of bearing 30 and cap 23 are then replaced and the upper part of the casing restored to place and the holding bolts inserted when the apparatus is again ready for use. I aim so far as possible to make all of the turbo-compressor units in a given installation alike so that the spare parts of one machine can be used in another, thereby reducing the amount of money tied up in said parts. I also prefer to so arrange the gas producing system that the turbo-compressors are arranged in pairs both receiving gas from the same source and delivering it to the same point. Under these conditions one machine would normally be idle but in position to be started immediately, it being understood that the conduits are provided with suitable shut-off valves.

The speed at which the compressor is operated depends on the amount of gas to be handled. Ordinarily it should be great enough to produce a slight suction on the generator and a pressure great enough to drive the gas through the tar extractors, scrubbers, etc., into the gas holder. If higher pressure is desired the compressor can be run at a higher speed or a second turbo-compressor may be employed in the pipe line which acts as a pressure booster.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an apparatus of the character described, the combination with a completely closed casing, a partition therein dividing the interior into two chambers, a motor in one chamber, a fluid impeller in the other chamber, a shaft that passes through the partition and transmits rotary motion from the motor to the impeller and is wholly inclosed by the casing walls, and bearings for the shaft also inclosed by the casing.

2. In an apparatus of the character described, the combination with a completely closed casing that is divided in an axial plane into two principal sections, a partition therein dividing the interior into two chambers, a motor in one chamber, a fluid impeller in the other chamber, a shaft that passes through the partition and transmits rotary motion from the motor to the impeller and is wholly inclosed by the casing walls, and bearings for the shaft also inclosed by the casing.

3. In an apparatus of the character described, the combination of a completely closed casing, a partition therein dividing it into chambers which are located side by side, an impeller in one of the chambers for compressing a fluid, a motor in another of said chambers, a shaft that passes through said partition and transmits rotary motion from the motor to the impeller and is wholly inclosed by the casing walls, and bearing means for the shaft also inclosed by the casing.

4. In an apparatus of the character described, the combination of a completely closed casing, a partition therein for dividing it into chambers which are located side by side, the walls of one chamber confining the fluid being compressed and the walls of the other the motive fluid, an impeller in one of the chambers for compressing a fluid, a turbine rotor in another of said chambers, a shaft that passes through said partition and transmits rotary motion from the rotor to the impeller and is wholly inclosed by the casing walls, bearing means for the shaft also inclosed by the casing, and inlet and outlets for the impeller and rotor.

5. In an apparatus of the character described, the combination of a completely closed casing that is divided in an axial plane into two principal sections, a partition therein which divides the casing into chambers that are located side by side, the walls of said chambers serving to confine different fluids, an impeller in one of the chambers for compressing a fluid, walls surrounding the impeller which are located in its chamber and assist in compressing the fluid, a turbine rotor in another of said chambers, a shaft that passes through said partition, transmits rotary motion from the rotor to the impeller and is wholly inclosed by the casing walls, bearing means for the shaft also inclosed by the casing, means preventing the exhaust fluid of the rotor from passing through the partition, and inlet and outlets for the impeller and rotor.

6. In an apparatus of the character described, the combination of an impeller for compressing a fluid, a turbine rotor for rotating it, a casing which is common to and incloses both the impeller and rotor and confines fluid under pressure, a shaft for the impeller and rotor which is located inside of the casing and is wholly inclosed thereby, a bearing for the shaft also located in a chamber within the casing, a partition for separating the impeller chamber from the bearing, a second bearing for the shaft also within the casing, a partition within the casing for separating the impeller chamber from the rotor chamber, and inlet and outlet conduits for the impeller and rotor.

7. In an apparatus of the character described, the combination of an impeller for compressing a fluid, a turbine rotor for rotating it, a casing which is common to and incloses both the impeller and rotor, a shaft for the impeller and rotor which is located inside of the casing and is wholly inclosed thereby, a bearing for the shaft also located within the casing, a partition for separating the impeller chamber from the bearing, a second bearing for the shaft also within the casing, a partition within the casing for separating the impeller chamber from the rotor chamber, packings for the shaft that are supported by the partitions, and inlet and outlet conduits for the impeller and rotor.

8. In an apparatus of the character described, the combination of a closed casing which is divided into upper and lower sections, partitions therein which divide it into chambers and are themselves divided in the same axial plane, an impeller for imparting pressure to a fluid, a turbine rotor and a shaft bearing each located in a separate chamber, a shaft for transmitting rotary motion from the rotor to the impeller, said shaft being totally inclosed by the casing walls and passing through said partitions, a bearing between the impeller and rotor, packings for the shaft where it passes through the partitions, and inlet and outlets for the impeller and rotor chambers.

9. In an apparatus of the character described, the combination of a casing, partitions for dividing it into chambers which contain different fluids under pressure, said casing and partitions being separable in the plane of the shaft, an impeller in one of the chambers, a turbine rotor for driving it located in another chamber, a shaft for the impeller and rotor which is located wholly within the casing, bearings and packings for the shaft which are removable with it when the upper part of the casing is removed, the packings being located in the partitions, and inlet and outlets for the impeller and rotor.

10. In an apparatus of the character described, the combination of a divided casing, the upper part of which is removable, a partition for dividing it into two fluid tight chambers, said chambers containing different fluids under pressure, an impeller for compressing a fluid located in one chamber, a turbine rotor for driving the impeller located in the other compartment, and conduits for conveying fluid to and from the impeller and rotor, all of which are connected to the lower part of the casing to prevent interference with the removal of the upper part of the casing.

11. In an apparatus of the character described, the combination with a casing containing an impeller and a turbine rotor for driving it, of means forming an elastic support for the casing, said means comprising conduits which convey fluid to and from the casing.

12. In an apparatus of the character described, the combination of a casing containing an impeller and turbine rotor for driving it, separate conduits which convey fluid to and from the impeller and form the sole support for the casing, and other conduits which convey fluid to and from the rotor for driving it.

13. In an apparatus of the character described, the combination with separate inlet and discharge conduits, of a casing containing an impeller and a motor for driving it mounted directly on the ends of and carried solely by the conduits whereby the same is elastically supported.

In witness whereof, I have hereunto set my hand this 27th day of March, 1914.

HENRY A. CARPENTER.

Witnesses:
J. L. HAFNER,
J. GILMORE FLETCHER.